Patented Apr. 7, 1953

2,634,250

UNITED STATES PATENT OFFICE 2,634,250

COMPOSITION OF MATTER COMPRISING A BUTADIENE - VINYL - PYRIDINE COPOLYMER AND A NOVOLAC

Lewis Y. Kiley, Westwood, N. J., assignor to United States Rubber Company, New York, N. Y., a corporation of New Jersey No Drawing. Application March 5, 1951, Serial No. 214,013

17 Claims. (Cl. 260—43)

This invention relates to new and useful compositions of matter. More particularly, it relates to compositions comprising mixtures of thermosetting phenolic resins of the novolac type with elastomeric materials which are copolymers of butadiene-1,3 with various mono-vinylpyridines including both unsubstituted and lower alkyl-substituted mono-vinylpyridines.

The phenolic resins, made by the condensation of phenols with aldehydes, are perhaps the best known and most widely used of the synthetic resins. In their ultimate cured condition they are hard, heat-resistant, and insoluble, and in addition possess great tensile strength. However, they are extremely brittle, and this property limits their usefulness to a marked degree. They cannot be employed when resistance to shock, or more than a slight degree of flexibility, is required. This lack of impact strength can be overcome to some degree by heavily loading these resins with certain fillers, particularly those, such as cotton flock, which are fibrous in character. However, for a great many purposes such loading is undesirable; in any event, only moderate improvement results therefrom.

Rubber and rubber-like elastomeric materials possess completely different properties from those of phenolic resins. These materials are inherently tough, and products molded from them possess extremely high impact strength. They possess elasticity and flexibility, qualities completely lacking in the phenolics. Accordingly, it might be expected that by blending rubber and a phenolic resin, it would be possible to obtain products exhibiting certain of the desirable properties of each component and that by varying the composition of the blended material wide variations in properties could be achieved. Thus, a rigid but shock-resistant product might be obtained from a mixture containing a high percentage of the phenolic resin. Tough, flexible and moderately elastic products would be expected to result from blends containing a relatively high concentration of the elastomeric component. However, as has long been known, the compatibility of phenolic resins with rubber is extremely limited. Only those resins which are greatly modified by the presence of long-chain aliphatic substituents in the phenol molecule, the so-called oil-soluble resins, exhibit any substantial solubility in rubber. Ordinary phenolic resins, lacking such solubilizing group, do not blend with rubber to give products of uniform composition. For that reason, no wide range of useful properties can be obtained therefrom. This same lack of compatibility exists between phenolic resins and the various commonly used synthetic rubbers, with the exception of those which are copolymers of acrylonitrile and butadiene. Blends of these latter materials with phenolic resins will hereinafter be compared with the present invention.

I have now unexpectedly discovered that elastomeric copolymers of butadiene-1,3 and mono-vinylpyridines are completely compatible with phenolic resins of the novolac type, and that a wide variety of useful compositions can be made by blending these materials. Upon curing such blends, there are produced products which have new and unexpectedly advantageous properties as compared with cured blends of butadiene-acrylonitrile rubbery copolymers and phenolic resins of the foregoing type.

Phenolic resins are prepared by the condensation polymerization of phenolic materials with aldehydes in the presence of an acid catalyst or an alkaline catalyst, the type of catalyst used depending upon the product desired. In their final cured state the phenolic resins are hard, infusible, and insoluble as a result of the cross-linking of polymer chains to form three-dimensional molecules. However, for the purpose of being mixed with other materials and molded into a desired shape the resin must be obtained in a fusible condition. This can be accomplished either by interrupting the condensation reaction before cross-linking has occurred, or, more preferably, by maintaining the ratio of phenol to aldehyde in the condensation reaction mixture at a value high enough that the aldehyde present reacts to form only linear polymer chains with the phenol, none being available to form cross links between these polymer chains. Almost invariably an alkaline catalyst is used in the first method, whereas an acid catalyst is usually used in the second method. The fusible resin obtained by the first method is known as a resole and can be converted to the final infusible state by continuing the heating in the presence of a catalyst. The fusible resin obtained by the second method is known as a novolac and is converted to the hard, infusible state by adding thereto additional aldehyde or a material which will decompose to give such aldehyde, and heating the resin mixture in the presence of a catalyst. The novolacs are distinguished by the fact that, practically speaking, they are permanently fusible and soluble and do not harden upon being heated. The novolacs are used in the practice of my invention.

The present invention is based upon the discovery that fusible phenolic resins of the novolac type can be dissolved in elastomeric copolymers of butadiene with a mono-vinylpyridine by first dispersing the resin in the elastomer at a temperature below the softening point of the resin and then heating the mixture above the softening point of the resin while mechanically blending the mixture to insure uniformity.

The rubbery copolymer used in my invention is preferably made by the peroxide-initiated emulsion polymerization of butadiene-1,3 and a mono-vinylpyridine. Such rubbery copolymers are well-known in the art, being described in U. S. Patent 2,402,020, German Patent 695,098, French Patent 849,126 and by Frank et al., Ind. & Eng. Chem., 40, 879 (1948). The mono-vinyl-pyridine can be any of the following:

2-vinylpyridine
3-vinylpyridine
4-vinylpyridine
2-methyl-5-vinylpyridine
5-ethyl-2-vinylpyridine
2-methyl-6-vinylpyridine
2-ethyl-4-vinylpyridine, etc.

Thus it can be any of the unsubstituted mono-vinylpyridines or it can be any of these which are substituted with an alkyl group. The 2-metyl-5-vinylpyridine and 5-ethyl-2-vinylpyridine are potentially cheap monomers and are especially preferred.

The relative proportions of the butadiene-1,3 and the mono-vinylpyridine combined in the rubbery copolymer can vary widely, providing that the requirement that the rubbery copolymer be compatible with the phenolic resin is met. Typically, the relative proportions range from 20 to 50% of combined monovinylpyridine and correspondingly from 80 to 50% of combined butadiene. The proportion of butadiene in the monomeric mixture charged to the polymerizer is usually slightly lower than that of combined butadiene in the copolymer produced. The monomers almost invariably consist solely of butadiene and the mono-vinylpyridine.

In the novolac resin the ratio of phenol to formaldehyde is relatively high, being such that the resin is fusible, and soluble in polar solvents. The resin may be a straight phenol-aldehyde resin or it may be modified with any suitable modifying agent according to known practice.

Thus, the resin can be based upon common "trifunctional" phenols, e. g., ordinary phenol. The "trifunctional" phenols are those which have only hydrogen in the three reactive positions ortho and para to the phenolic hydroxyl group. The resin can be modified by employing such a trifunctional phenol in conjunction with another phenol which may be trifuctional, difunctional or monofunctional. For example, I can use a resin based upon ordinary phenol but modified or co-condensed with a lesser proportion of any of the following phenols, which may be either pure or mixed: the cresols, the xylenols, the trimethylphenols, monochlorophenols, diamylphenols, diisopropylphenols, p-tertiary - butylphenol, o-methyl-p-tertiary-butylphenol, p-phenylphenol, resorcinol, and hydroquinone. I often employ a resin based upon a mixture of ordinary phenol and the phenol which is obtained from cashew nut shell oil by heating whereby it is converted to the long-chain unsaturated phenol commonly known as cardanol. When a mixture of ordinary phenol and cardanol is reacted with formaldehyde in a manner well-known to the art, there is produced a thermosetting, soluble, fusible, cashew nut shell oil-modified resin which, upon being heated with a minor proportion of hexamethylenetetramine, is converted to the insoluble, infusible state. The amount of cardanol employed for modifying the resin preferably ranges from 3 to 12 mol-percent of the phenol mixture.

Cashew nut shell oil modified phenol-aldehyde resins which are extremely satisfactory for use in the present invention are available commercially. An example of such a resin is that known in the trade as Durez 12686. Another examples is Durez 12687, which is a mixture of 9294 parts of Durez 12686 and 6–8 parts of hexamethylenetetramine. Such resins are typically made by heating the phenols and the aldehyde, typically formaldehyde, in the presence of an acidic catalyst, e. g., sulfuric or hydrochloric acid, to an oil-soluble stage. During the final stage of the resin-forming reaction, the resin is advanced to the desired state at which it is still potentially reactive, and volatile materials are removed therefrom, these objectives being accomplished by passing superheated steam through the charge until the residual mixture has reached a suitable elevated temperature, e. g., 150° C. to 225° C.

The resins made with cardanol as a modifying phenol have a considerably lower softening point than those made with ordinary phenol or cresol as the sole phenolic component. This enables incorporation of the resin with the rubber to form a mutual solution at a correspondingly lower temperature. At the same time, the products obtained appear to have better physical properties.

The products of my invention display a wide range of useful properties. Those containing from 30 to 70% of the resin and correspondingly from 70 to 30% of the rubber, are rigid, but display great resistance to mechanical shock. They do not exhibit the extreme brittleness of the straight phenolic resin. Because of their toughness and hardness they are adapted for use in fabricating rigid articles such as containers, instrument cases, gears, etc. Within this class, I especially prefer those materials containing from 30 to 50% of the resin and correspondingly from 70 to 50% of the rubber. The materials containing a still lower percentage of the resin, i. e., those containing 10 up to 30% by weight of the resin and correspondingly from 90 down to 70% of the rubber, are flexible but are only moderately extensible; they may be classified as leathery in character. They find use in the manufacture of shoe soles, artificial leather, etc.

Compositions containing from 5 up to 10% of the resin and correspondingly from 95 down to 90% of the rubber are very valuable, since such small amounts of the resin raise the tensile strength and toughness of the elastomer and impart substantially better ozone resistance; such compositions are of particular utilitey for flexible shoe soling, gaskets, and diaphragms where moderate stiffness is desired.

It will be seen that the proportions can vary from 5 to 70% of the resin and correspondingly from 95 to 30% of the rubber.

All of the compositions of my invention, when in the cured form, are highly resistant to the action of ordinary solvents, such as benzene, alcohol, gasoline, etc. This property is most pronounced in products of a high phenolic resin content.

The cured products of my invention are resistant to the action of ozone to a remarkable degree. For this reason, they are extremely valuable as insulating covers for conductors for use on electrical equipment where ozone is generated and where ordinary rubber insulation fails rapidly in service.

The practice of my invention requires only the equipment ordinarily used in standard rubber technology. The mixing of the fusible phenolic resin (the novolac) and the elastomer, and the compounding of the blended mixture with the curing agents and other desired ingredients, can be easily carried out on the ordinary rubber mill or in the Banbury mixer, provided that these be equipped with means for cooling and heating. In general, the preparation of the stocks is as follows. The elastomer is broken down on a cold mill, softeners and plasticizers being added if desired. The solid novolac-type phenolic resin, in powdered or granular form, is then added. Milling and blending are continued until the phenolic resin is uniformly distributed throughout the rubber phase. At this stage of the operation there is no solution of the one component in the other; rather there is a mere mechanical mixture. Steam is next admitted to the mill rolls to raise the temperature of the stock to at least the softening point of the phenolic resin. At or above this temperature continued milling and blending quickly bring about a state of homogeneity and mutual solution. The steam is turned off and cold water is admitted to the rolls to cool the stock. Compounding ingredients such as hardening agents for the resin, anti-oxidants for the rubber fillers, and pigments can then be added and uniformly dispersed. The product is then ready for fabrication by a variety of methods.

The temperature to which the mixture of resin and rubber is heated to effect fusion of the resin and rubber will depend upon whether or not the hardening agent for the resin is present. If the hardening agent is present, the mixing temperature should not exceed 115° C. in order to prevent premature curing of the resin. The temperature should, however, be at least equal to the softening point of the resin. Temperatures ranging from 75° C. to 115° C. are almost invariably used. If the hardening agent is absent, the upper limit on the temperature used in the solution step is that at which thermal decomposition of the resin or rubber takes place.

The temperature to which the mixture is subjected from the time at which the hardening agent for the resin is incorporated until the final curing of the shaped article is begun, must not be allowed to reach that at which the resin would be advanced to the insoluble, infusible stage. An upper limit of 115° C. also applies here.

The solid mixture can be cooled and granulated in the conventional way to give a molding powder which can be molded under heat and pressure in the usual way to consolidate the granules into a continuous integral mass at temperatures high enough to advance the resin component to the insoluble, infusible state.

For particular applications where the complications and expense of a solvent can be tolerated, a homogeneous material can be made by dissolving the resin and the elastomer in a mutual solvent. Compounding ingredients may then be dissolved or dispersed in this solution, which may be used as such as a cement or coating composition. Alternatively, the solvent can be evaporated from the solution to give the solid product.

The compounded stocks can be fabricated and cured by any of the well-known techniques of the rubber and plastic arts. Thus, they can be molded in ordinary compression molds; they can be extruded by conventional means; they can be calendered into the form of sheets and can be frictioned onto fabrics as coatings. Dissolved in proper solvents or dispersed in various media, such as water, they may be used to impregnate various porous materials such as fabrics, paper, and leather. Sheet materials, such as fabrics, impregnated with these products may be plied up and laminated by the application of heat and pressure to form a solid built-up structure of great thickness.

Regardless of the method by which my compositions are shaped or fabricated to the final shape, they are subsequently cured, preferably at from 120° C. to 175° C., to advance the resin to the final insoluble, infusible condition.

The hardening agents used for the resin in the practice of my invention are those ordinarily employed in the molding and curing of phenolic resins of the novolac type. These hardening agents are materials which under the influence of heat decompose to supply the formaldehyde needed to cause cross-linking of phenol-aldehyde polymer chains. Hexamethylene tetramine ("hexa") and paraformaldehyde ("paraform"), both of which act as sources of formaldehyde, are most frequently used. However, paraform is the preferred material in the practice of my invention.

For use in the examples to follow several phenolic resins were prepared. The composition, in parts by weight, of the reaction mixtures from which the resins were obtained is given in the table below, together with the softening point of the resins.

*Table I*

| Resin | A | B | C | D | E |
|---|---|---|---|---|---|
| Phenol | 846 | 1,638 | 1,410 | 1,410 | |
| Cardanol | 344 | 648 | | | |
| Formalin | 640 | 1,346 | 1,022 | 1,022 | 567 |
| Cresylic Acid | | | | | 1,158 |
| Oxalic Acid | | 7.5 | 7.5 | 7.5 | 11.0 |
| Conc. HCl (40%) | 16 | 35 | 21 | 21 | |
| Water | | 240 | 240 | 240 | 110 |
| Final Pot Temp. ° C. | 200 | 200 | 185 | 185 | 200 |
| Softening Pt. of dried resin | 75–6 | 78–80 | 106–9 | 111–112 | 108–110 |

The formalin employed was the ordinary commercial grade, containing approximately thirty eight percent of formaldehyde.

Resins B, C and D were prepared by the same method. The phenolic materials were mixed with the formalin and placed in a reaction vessel equipped with stirrer, thermometer, and reflux condenser. To this solution there was added a solution of the oxalic acid in water and the resultant mixture was heated to 95° C. and maintained at that temperature for two hours. The concentrated hydrochloric acid was then added and the heating was continued at 95° C. for three hours. The resins were then dried by passing superheated steam into the reaction mixture until the indicated final pot temperature was reached. The hot resin was then poured onto a clean surface to cool, after which it was crushed to a coarse powder.

Resins C and D were made in duplicate runs; the slight difference in softening points is due to minor unavoidable variations in processing.

In the preparation of resin A the phenol, cardanol, and hydrochloric acid were placed in the reaction vessel and heated to 110° C. The formalin was then added slowly and with stirring. When the addition was complete and the exothermic reaction had subsided, the reaction mixture was heated to reflux and maintained there for three hours. Superheated steam was then passed into the reaction product until a temperature of 200° C. was reached, after which the resin was poured onto a clean surface to cool and solidify.

In the preparation of resin E the oxalic acid was dissolved in water and half of this solution was added to the cresylic acid and formalin contained in the reaction vessel. The mixture was warmed, with stirring, to the temperature of reflux. The remaining oxalic acid solution was then added, after which heating and stirring were continued for three hours. Drying was accomplished as above described.

Example I

Each of the above resins was compounded with a vinyl-pyridine rubber made by the emulsion copolymerization of 75 parts of 1,3-butadiene and 25 parts of 2-vinylpyridine to a Mooney viscosity of 43. This rubber is designated Rubber A. The resin in powder or granular form was added to the rubber and intimately mixed on a cold mill. When the dispersion of the resin in the rubber was complete, the mill was heated just enough to bring the mixture to the softening point of the resin. The resins dissolved readily in the rubber to form clear, brown thermoplastic stocks, which were extremely tough at room temperature. The mill was then cooled and the desired compounding ingredients were added. Samples of these stocks were then cured in a flat slab mold under a pressure of 4000 p. s. i. for thirty minutes during which time the mold was heated by steam at 100 p. s. i. (170° C.). In Table II the compositions of the various rubber-resin compounds are given, together with certain properties of the cured samples.

Table II

| Compound | 1 | 2 | 3 | 4 | 5 | 6 | 7 |
|---|---|---|---|---|---|---|---|
| Vinylpyridine Rubber A | 100 | 100 | 100 | 100 | 100 | 100 | 100 |
| Phenolic Resin A | 100 | 100 | | | | | |
| Phenolic Resin B | | | | | | | 100 |
| Phenolic Resin D | | | 100 | | | 100 | |
| Phenolic Resin E | | | | 100 | 100 | | |
| Paraform | 5 | 8 | 6 | 8 | 6 | 6 | 6 |
| Hardness (Shore A) | 91 | 95 | 91 | 92 | 85 | 91 | 94 |
| Swelling Index | 1.96 | 1.19 | 2.48 | 2.05 | | | 1.54 |
| Tensile Strength p. s. i. | 3,300 | 3,500 | 3,100 | 2,500 | 1,500 | 2,400 | 2,700 |
| Breaking Elongation (Percent) | 150 | 70 | 90 | 70 | 180 | 70 | 110 |
| Percent Set | 59 | 25 | 52 | 28 | 36 | 16 | 39 |

The swelling index given above refers to the number of parts by weight of cyclohexanone that one part of the sample will absorb at equilibrium. This index is an inverse measure of the state of cure or degree of cross-linking of the sample, inasmuch as the uncured materials are completely soluble in cyclohexanone, and the amount of cyclohexanone the sample is capable of absorbing decreases with increasing degree of cure.

It will be evident that the products have properties quite different from those found in ordinary phenolic resins. The cured samples in all cases were clear, rigid, tough materials.

Example II

This example shows that the phenolic resins and vinylpyridine rubber are compatible over a wide range of composition and that the properties of the resulting mixture depend on the relative amount of each component in the mixture. Vinylpyridine rubber and phenolic resin A were blended in various proportions, the rubber being that employed in Example I. The composition of the mill-blended mixtures and the properties of the cured samples are set out in Table III. All samples were cured for thirty minutes at 100 p. s. i. steam pressure (170° C.)

Table III

| Compound | 8 | 9 | 10 | 11 | 12 |
|---|---|---|---|---|---|
| Phenolic Resin A | 50 | 100 | 133 | 150 | 200 |
| Vinylpyridine Rubber A | 100 | 100 | 100 | 100 | 100 |
| Paraform | 4 | 8 | 10.7 | 12 | 16 |
| Swelling Index | 1.77 | 1.39 | 1.17 | 1.12 | 1.07 |
| Hardness (Shore D) | | 53 | 58 | 62 | 65 |
| Flexural Modulus × $10^{-3}$ at 25° C | | 58 | 77 | 91 | 103 |

It is readily apparent that the composition of the mixture of the rubber and the phenolic may be varied over wide limits with consequent gradual variation in the properties of the product. The preferred choice of composition then depends on the use for which the product is intended and the properties required. The data show that the higher the concentration of the phenolic resin in the mixture, the harder and more rigid is the resulting cured product. The higher rigidity or stiffness is indicated by the higher flexural modulus values.

Example III

The purpose of this example is to show that the discovery of the compatibility of phenolic resins with vinylpyridine-butadiene rubber is not limited to a rubber of a single composition but rather includes such rubbers of a wide range of composition. For use in this example the following vinylpyridine rubbers were prepared by emulsion polymerization:

| Vinylpyridine Rubber | B | C | D |
|---|---|---|---|
| 2-Vinylpyridine | 50 | 35 | 20 |
| Butadiene | 50 | 65 | 80 |

These materials were blended with various phenolic resins and compounding ingredients in the manner described in Example I above. In Table IV following, the composition of the mixtures and the properties of the cured samples are listed. In all cases the rubber and the phenolic resin were found to blend readily and smoothly on the warm mill. Blending was accomplished in the same way as before.

Table IV

| Compound | 13 | 14 | 15 | 16 |
|---|---|---|---|---|
| Vinylpyridine Rubber B | 100 | | | |
| Vinylpyridine Rubber C | | 100 | 100 | |
| Vinylpyridine Rubber D | | | | 100 |
| Phenolic Resin C | 100 | | | |
| Phenolic Resin E | | | | 100 |
| Phenolic Resin B | | 100 | 100 | |
| Paraform | 3 | | 8 | 4 |
| Hexamethylene tetramine | | 4 | | |
| Flexural Modulus at 25° C | 130,000 | | | 30,000 |
| Notched Impact, ft. lb./in. | 2.3 | | | 11.5 |
| Rockwell Hardness | | R-43 | R-64 | |
| Tensile Strength (p. s. i.) | | 2,900 | 3,800 | 2,500 |
| Percent Elongation at Break | | 141 | 80 | 160 |

All of the compositions given above were cured in flat slab molds at a pressure of 4,000 lbs./sq. in.; the molds were heated by steam at atmospheric pressure for two hours and by steam at 100 lbs./sq. in. (170° C.) for an additional thirty minutes. It is evident from the data obtained that variation in the properties of the rubber-resin combination may be obtained by varying the composition of the vinylpyridine-butadiene elastomeric constituent as well as by the earlier described method of varying the ratio of rubber to resin.

*Example IV*

| Compound | 17 | 18 |
|---|---|---|
| Hycar OR-15 | 100 | |
| Vinylpyridine Rubber A | | 100 |
| Durez 12686 | | 100 |
| Durez 12687 | 100 | |
| Paraform | | 4 |

In order to illustrate the resistance of vinylpyridine rubber and phenolic resin blends to the action of ozone, and to demonstrate their superiority in this regard to the corresponding nitrile rubber (Hycar) and phenolic resin blends, compounds 17 and 18 were prepared as before and cured for thirty minutes at 100 p. s. i. steam pressure (170° C.) in sheets approximately 0.1" thick. Test samples measuring 3" x 1" were cut from these sheets. These samples were bent lengthwise and the ends clamped together so as to maintain the samples in a strained condition, and were placed in a chamber through which ozonized air was passed. Within thirty-four minutes compound 17 had failed, developing deep cracks along the outwardly curved surface. In contrast to this behavior, compound 18, the vinylpyridine rubber and phenolic resin blend, showed no evidence of attack by the ozone at the end of twelve hours.

*Example V*

This example is intended to illustrate the fact that variation in certain properties of the cured product of my invention can be obtained by the addition of fillers according to the standard practice of rubber technology. The inclusion of fillers offers improvement in specific properties such as processability, hardness and toughness.

(a) One hundred parts of vinylpyridine rubber A were mixed with 100 parts of phenolic resin A on a warm mill. The mill was then cooled and 100 parts of finely divided diatomaceous earth (Dicalite 14W) were added and milled in, followed by 8 parts of paraformaldehyde, 1.67 parts of Agerite White (sym. di-beta-naphthyl-para-phenylenediamine), 1.67 parts of zinc stearate, and 10 parts of red lead oxide. A second stock was prepared from which the Dicalite 14W, Agerite White and red lead oxide were omitted. Each of these stocks was cured between platens at 4000 p. s. i. pressure for thirty minutes at the temperature of steam at 100 p. s. i. pressure. The cured material containing the filler had a flexural modulus of 99,000 p. s. i. at room temperature, whereas that from the non-loaded stock had a flexural modulus of only 58,000 p. s. i.

(b) In the same manner as in (a), a stock was compounded from 100 parts each of the same resin and rubber, and 8 parts of paraformaldehyde, 1 part of paratoluenesulfonic acid and 40 parts of a carbon black known as Philblack-O. After being cured under conditions identical with those in (a) this stock was found to have a flexural modulus of 83,000 p. s. i. at 25° C.

(c) One hundred parts of vinylpyridine rubber B were mixed on a mill in the manner previously described with 50 parts of phenolic resin C, 75 parts of Suprex clay, 2 parts of zinc stearate and 3 parts of paraformaldehyde, and cured for thirty minutes at 100 p. s. i. steam pressure. The hard, tough molded plate thus produced was found to have a flexural modulus of 168,000 p. s. i. at 25° C. A similar stock from which the filler and zinc stearate were omitted had a flexural modulus of 130,000 p. s. i. at 25° C.

The foregoing examples illustrate the use of rubbery copolymers of butadiene and 2-vinylpyridine. There now follow Examples VI to IX showing the use of rubbery copolymers of butadiene with isomers and homologs of 2-vinylpyridine.

*Example VI*

In this example a copolymer of butadiene and 4-vinylpyridine is made by the peroxide-initiated emulsion polymerization of a monomer charge of 70 parts of butadiene and 30 parts of 4-vinylpyridine. This rubbery copolymer (vinylpyridine rubber E) was blended with a phenol formaldehyde resin and with a hardening agent in the manner described above. Samples were cured as before.

The formulations used and the physical properties of the cured products are listed in the following table. Creep factor is the ratio of the deformation produced by a torsional load acting during 100 seconds to the deformation produced by the same load acting during 10 seconds.

*Table VI*

STOCKS INVOLVING COPOLYMERS OF BUTADIENE AND 4-VINYLPYRIDINE

| Compound No | 19 | 20 | 21 | 22 | 23 | 24 | 25 | 26 |
|---|---|---|---|---|---|---|---|---|
| Vinylpyridine Rubber E | 100 | 100 | 100 | 100 | 100 | 100 | 100 | 100. |
| Phenolic Resin: | | | | | | | | |
| Durez 12686 | 100 | | | | | | | |
| Durez 12687 | | 100 | | | | | | |
| Resin B | | | 100 | 100 | 100 | | | |
| Resin C | | | | | | 50 | 93 | 100. |
| Curative: | | | | | | | | |
| Paraform | 4 | | 4 | 6 | 8 | 3 | | 6. |
| Hexa | | | | | | | 7 | 104. |
| Filler: Suprex Clay | | | | | | | | |
| Compatibility | good | good | good | good | good | good | good | good. |
| Shore D | 66 | 63 | 65 | 68 | 67 | 58 | 64 | |
| Swelling Index | 1.75 | 1.16 | 2.13 | 1.21 | 0.83 | 1.50 | | 0.86. |
| Flexural Modulus (25° C.) | | 85,000 | | 87,000 | 103,000 | 51,000 | 76,000 | 174,000. |
| Creep Factor (25° C.) | | 1.08 | | 1.18 | 1.13 | 1.14 | 1.09 | 1.33. |
| Impact (ft. lb./in.) | | 1.22 | | 0.49 | 0.72 | 10.0 | 2.30 | 1.1. |

*Example VII*

In this example rubbery copolymers of butadiene and 4-vinyl-2-ethylpyridine were used. Rubber F was made from a monomer charge containing 75% butadiene and 25% 4-vinyl-2-ethylpyridine. Rubber G was made from a charge containing 60% butadiene and 40% 4-vinyl-2-ethylpyridine. Each of these rubbery copolymers was blended as before with phenolic resins and curatives. The formulations and physical properties were those given in Table VII below.

*Table VII*

| Compound No | 27 | 28 | 29 | 30 | 31 | 32 | 33 |
|---|---|---|---|---|---|---|---|
| Vinylpyridine Rubber F | 100 | | | | | | |
| Vinylpyridine Rubber G | | 100 | 100 | 100 | 100 | 100 | 100 |
| Phenolic Resin: | | | | | | | |
| Durez 12686 | 100 | 100 | | | | | |
| Resin B | | | 100 | | 100 | 100 | 200 |
| Resin C | | | | 50 | | | |
| Curative: Paraform | 8 | 4 | 4 | 2 | 6 | 5 | 10 |
| Filler: | | | | | | | |
| Diatomaceous Earth | | | | | | | |
| Suprex Clay | | | | | 104 | | |
| Cure: 30' at 100# steam | | | | | | | |
| Compatibility | Yes | Yes | Yes | Yes | Yes | Yes | Yes |
| Shore D | | 66 | 65 | 25 | 76 | | |
| Swelling Index | | 1.75 | 2.13 | | | | 1.62 |
| Flexural Modulus (25° C.) | | | | | 187,000 | | 137,000 |
| Creep Factor (25° C.) | | | | | 1.35 | | 1.17 |
| Impact (ft. lb./in.) | | | | | 0.48 | | 0.4 |

Rubbery copolymers made with 4-vinyl-2-ethylpyridine exhibit substantially lower compatibility with a particular resin than corresponding copolymers made with 2-vinylpyridine or 4-vinylpyridine.

*Example VIII*

In this example a rubbery copolymer made by emulsion polymerization of 60% butadiene and 40% 2-vinyl-5-ethylpyridine (vinylpyridine rubber H) was blended with two different phenolic resins and the mixtures cured as before. The formulations and properties of the product are given in the following Table VIII.

*Table VIII*

| Compound No | 34 | 35 | 36 | 37 |
|---|---|---|---|---|
| Vinylpyridine Rubber H | 100 | 100 | 100 | 100 |
| Phenolic Resin B | 100 | 93 | | 139.5 |
| Phenolic Resin C | | | 50 | |
| Curative: | | | | |
| Paraform | 5 | | 3 | |
| Hexa | | 7 | | 10.5 |
| Cure: 30' at 100# steam | | | | |
| Compatibility | Yes | Yes | Yes | Yes |
| Shore A | | 68 | 86 | |
| Swelling Index | 1.99 | | | 1.07 |
| Flexural Modulus (25° C.) | 52,000 | | | 44,000 |
| Creep Factor (25° C.) | 1.32 | | | 1.11 |
| Impact (ft. lb./in.) | 2.8 | | | 1.44 |
| Tensile | | 2,110 | 1,360 | |
| Percent Elongation at Break | | 570 | 260 | |
| Percent Set | | 23 | 31 | |

*Example IX*

In this example, a rubbery copolymer of 60% butadiene and 40% 5-vinyl-2-methylpyridine (vinylpyridine rubber I) was blended with a cardanol-modified phenolic resin in the same way as before. The data are set forth in Table IX.

*Table IX*

| Compound No | 38 | 39 | 40 | 41 |
|---|---|---|---|---|
| Vinylpyridine Rubber I | 100 | 100 | 100 | 100 |
| Phenolic Resin B | 100 | 100 | 100 | 100 |
| Filler (20 ccs./100 g.): | | | | |
| Diatomaceous Earth | | 97 | | |
| Carbon Black | | | 75 | |
| Curing Agent: | | | | |
| Paraform | 6 | 6 | 6 | |
| Hexa | | | | 7.5 |
| Zn Stearate | 2 | 2 | 2 | 2 |
| Properties of Cured Stocks: | | | | |
| Shore D | 73 | 78 | 85 | 73 |
| Flexural Modulus × 10⁻³ (25° C.) | 121 | 217 | 254 | 103 |
| Creep Factor (25° C.) | 1.28 | 1.34 | 1.22 | 1.12 |
| Impact Strength | 0.86 | 0.33 | 0.54 | 1.13 |

The 5-vinyl-2-methylpyridine copolymers appear to closely approach the copolymers of unsubstituted monovinylpyridines as regards compatibility with the novolacs.

Generally speaking, extensive substitution, as with ethyl, on the monovinylpyridine monomer requires that a greater percentage of this monomer be present in the copolymer in order to obtain compatibility with the phenolic resin. Furthermore, cardanol-modified phenolic resins exhibit greater compatibility with rubbery monovinylpyridine copolymers than do novolacs made with straight phenol or cresol. Thus a rubbery copolymer which is incompatible with such straight phenolic resin often exhibits complete compatibility with a cardanol-modified phenolic. For the cardanol-modified phenolic resins, the lower limit of compatibility is at about 15% monovinylpyridine content of the rubbery copolymer.

There is no upper limit of vinylpyridine content above which the phenolic again becomes incompatible, but when the vinylpyrdine content gets much higher than 50% the polymers get progressively harder and tougher, and mixtures with the phenolic resins are hard and brittle even at moderately elevated temperatures.

Styrene-butadiene rubbery copolymers are not compatible with the phenolic resins used herein, although they closely resemble vinylpyridine rubbers except for the tertiary amine group. It is believed that there is a strong polar attraction between the phenolic hydroxyl group and the basic nitrogen atom in the vinylpyridine, and this accounts for the compatibility as well as for the enormous increase in the tensile strength and toughness of the blends, both cured and uncured.

*Example X*

In British Patent 595,290 there is described a composition comprising a blend of alpha-vinylpyridine-diolefin elastomer with a phenolic resin. The resins there employed are of the heat-hardenable or resole type. They are used as aqueous solutions and are blended with the elastomer component by the addition of such water solutions to the latex form of the elastomer. Inasmuch as the phenolic resin component of my invention is of the novolac type, that is, not convertible merely by the action of heat, and since my invention contemplates a different method of blending the two components, one of the compounds of the British patent was prepared for the purpose of direct comparison. Example I of the patent was followed, except for immaterial variations among which was the fact that a different antioxidant was employed in the elastomer.

A mixture of 75 parts of butadiene-1,3 and 25 parts of alpha-vinylpyridine was emulsified in 150 parts of water containing 4 parts of sodium oleate, 0.5 part of sodium hydroxide, 1 part of a formaldehyde-sodium naphthalenesulfonate reaction product, 1 part of potassium persulfate and 0.1 part of potassium ferricyanide. One-half part of lauryl mercaptan was added and the emulsion was placed in glass pressure bottles, sealed, and heated for 15 hours with constant agitation. To the resulting latex there were added 2 parts of phenyl beta-naphthylamine in the form of an aqueous dispersion as an antioxidant.

The latex contained 34% solids.

A resole solution was prepared by dissolving 110 parts of resorcinol and 244 parts of a 37% aqueous formaldehyde solution in 475 parts of water at 25° C.

To 118 parts of the latex prepared above there were added 100 parts of water, 82 parts of the resole solution and 0.6 part of sodium hydroxide as a 10% aqueous solution to give a mixture in which the ratio (by weight) of elastomer to resole was 2/1.

(A) A sample of the latex-resole mixture was poured in a thin film on glass and dried overnight at room temperature. The clear film obtained was mixed on the mill at 25-40° C., molded and cured for thirty minutes at 140 p. s. i. steam pressure. The molded samples displayed a low flexural modulus and were easily torn by hand.

(B) Pieces of the cast film described in A above were allowed to stand at room temperature for several days. These films were clear and tough, but on being bent sharply they exhibited opacity at the fold line, with consequent decreased strength in this area. The development of opacity is taken to indicate phase separation, showing that the samples are not homogeneous.

(C) Pieces of the film from B above were plied together and mold cured under pressure for thirty minutes at 140-145° C. The cured stocks were hard, brittle and stiff. The plies could be separated readily, indicating that little flow had occurred in the mold.

Example X shows that the teachings of British Patent 595,290 do not foreshadow the present invention because the type of phenolic resin used therein is totally different from that used in my invention; it would not be possible to secure my results using a resole because, the moment the resole was dehydrated to remove the water, it would be advanced to the insoluble, infusible state in which it would be impossible to incorporate it with the vinylpyridine-diolefin elastomer to give a homogeneous, intimate mixture having useful properties and being moldable and curable to the final desired shape. Such a resole could not be caused to dissolve in the rubber in the manner in which I effect mutual solution of my novolac resin and my rubber. Furthermore, if it were attempted to incorporate a resole with solid rubber in the conventional manner, i. e., on a rubber mill or in a Banbury mixer, the moderate heat required for intimate mixing would rapidly advance the resole to the insoluble, infusible stage, giving a worthless material.

Example X further shows that after the mixture of the British patent has dried to film form, it is not possible to effect molding or lamination of such films to form a useful material of considerable thickness.

The British patent had in mind only the preparation of an aqueous adhesive composition particularly designed for solutioning tire cords, and was not seeking to produce a material such as is contemplated by applicant, namely, a solid, moldable, curable material which contains substantially no free water, which is based on a mutual solution of a novolac and a monovinylpyridine rubber, and which can be molded into thick structures.

*Example XI*

This example shows the poor physical properties of blends of rubbery butadiene-acrylonitrile copolymers and unmodified phenol-aldehyde resins of the novolac type. In this example, the rubbery butadiene-acrylonitrile copolymer sold as "Hycar OR-15" was blended with the unmodified phenolic resin C whose preparation is given above. Zinc stearate was used as a mold lubricant. In one case hexa was used as the hardening agent, while in the other case paraform was employed. The mixtures were cured as in Example I. The data were as follows:

| Compound No. | 42 | 43 |
| --- | --- | --- |
| Hycar OR-15 | 100 | 100 |
| Phenolic Resin C | 50 | 50 |
| Zinc Stearate | 2 | 2 |
| Hexa | 4 | |
| Paraform | | 3 |
| Properties of Cured Stocks: | | |
| Shore D | 38 | 34 |
| Flexural Modulus $\times 10^{-3}$ at 25° C | 12.3 | 6.3 |
| Flexural Modulus $\times 10^{-3}$ at 100° C | 2.8 | 0.4 |
| Creep Factor at 25° C | 1.17 | 2.49 |
| Creep Factor at 100° C | 1.42 | 1.00 |
| Impact Strength | (¹) | (¹) |

¹ Too soft to be measured.

These data show that the use of nitrile rubber in place of the vinylpyridine rubber of the present invention in conjunction with the relatively cheap straight (unmodified) phenolic resins seriously impairs the flexural modulus. This is brought out by comparison of compound 24 (Example VI) with compounds 42 and 43. The stiffening action of the unmodified phenolic resins is not nearly so great with nitrile rubber as with vinylpyridine rubber. The cured products from compounds 42 and 43 were exceedingly soft and rubber-like and not at all comparable with a comparison product in which the nitrile rubber is replaced with vinylpyridine rubber.

By the term "thermosetting" as used in this specification and in the claims to define the phenol-aldehyde resin used, I mean that the resin is capable of being converted to insoluble infusible form upon being heated with a formaldehyde-yielding hardening agent.

Having thus described my invention, what I claim and desire to protect by Letters Patent is:

1. A composition of matter comprising a mixture of a thermosetting, soluble, fusible phenol-aldehyde resin of the novolac type, a rubbery copolymer of butadiene-1,3 and a monovinylpyridine selected from the group consisting of unsubstituted monovinylpyridines and alkyl substituted monovinylpyridines, said resin and said rubbery copolymer being mutually compatible, and a formaldehyde-yielding hardening agent for said resin.

2. A composition as set forth in claim 1 wherein said monovinylpyridine is 5-vinyl-2-methylpyridine.

3. A composition of matter comprising a mixture of a thermosetting, soluble, fusible phenol-aldehyde resin of the novolac type, a rubbery copolymer of butadiene-1,3 and a monovinylpyridine selected from the group consisting of unsubstituted monovinylpyridines and alkyl substituted monovinylpyridines, said resin and said rubbery copolymer being mutually compatible and being present in the relative proportions of from 5 to 70% of said resin and correspondingly from 95 to 30% of said rubbery copolymer, said percentages being by weight based on the sum of said resin and said rubbery copolymer, and a formaldehyde-yielding hardening agent for said resin.

4. A composition of matter comprising a mixture of a thermosetting, soluble, fusible phenol-aldehyde resin of the novolac type, a rubbery copolymer of butadiene-1,3 and a monovinylpyridine selected from the group consisting of unsubstituted monovinylpyridines and alkyl substituted monovinylpyridines, said resin and said rubbery copolymer being mutually compatible and being present in relative proportions of from 30 to 50% of said resin and correspondingly from 70 to 50% of said said rubbery copolymer, said percentages being by weight based on the sum of said resin and said rubbery copolymer, and a formaldehyde-yielding hardening agent for said resin.

5. A composition of matter comprising a mixture of a thermosetting, soluble, fusible phenol-aldehyde resin of the novolac type, a rubbery copolymer of butadiene-1,3 and a monovinylpyridine selected from the group consisting of unsubstituted monovinylpyridines and alkyl substituted monovinylpyridines, said resin and said rubbery copolymer being mutually compatible and being present in relative proportions of from 10 up to 30% of said resin and correspondingly from 90 down to 70% of said rubbery copolymer, said percentages being by weight based on the sum of said resin and said rubbery copolymer, and a formaldehyde-yielding hardening agent for said resin.

6. A composition of matter comprising a mixture of a thermosetting, soluble, fusible phenol-aldehyde resin of the novolac type, a rubbery copolymer of butadiene-1,3 and a monovinylpyridine selected from the group consisting of unsubstituted monovinylpyridines and alkyl substituted monovinylpyridines, said resin and said rubbery copolymer being mutally compatible and being present in relative proportions of from 5 up to 10% of said resin and correspondingly from 95 down to 90% of said rubbery copolymer, said percentages being by weight based on the sum of said resin and said rubbery copolymer, and a formaldehyde-yielding hardening agent for said resin.

7. A heat-cured homogeneous mixture of a thermosetting, soluble, fusible phenol-aldehyde resin of the novolac type, and a rubbery copolymer of butadiene-1,3 and a monovinylpyridine selected from the group consisting of unsubstituted monoyinylpyridines and alkyl substituted monovinylpyridines, said resin and said rubbery copolymer being mutually compatible, and a formaldehyde-yielding hardening agent for said resin.

8. A composition as set forth in claim 7 wherein said monovinylpyridine is 5-vinyl-2-methylpyridine.

9. A heat-cured homogeneous mixture of a thermosetting, soluble, fusible phenol-aldehyde resin of the novolac type, a rubbery copolymer of butadiene-1,3 and a monovinylpyridine selected from the group consisting of unsubstituted monovinylpyridines and alkyl substituted monovinylpyridines, said resin and said rubbery copolymer being mutually compatible and being present in relative proportions of from 5 to 70% of said resin and correspondingly from 95 to 30% of said rubbery copolymer, said percentages being by weight based on the sum of said resin and said rubbery copolymer, and a formaldehyde-yielding hardening agent for said resin.

10. A heat-cured homogeneous mixture of a thermosetting, soluble, fusible phenol-aldehyde resin of the novolac type, a rubbery copolymer of butadiene-1,3 and a monovinylpyridine selected from the group consisting of unsubstituted monovinylpyridines and alkyl substituted monovinylpyridines, said resin and said rubbery copolymer being mutually compatible and being present in relative proportions of from 30 to 50% of said resin and correspondingly from 70 to 50% of said rubbery copolymer, said percentages being by weight based on the sum of said resin and said rubbery copolymer, and a formaldehyde-yielding hardening agent for said resin.

11. A heat-cured homogeneous mixture of a thermosetting, soluble, fusible phenol-aldehyde resin of the novolac type, a rubbery copolymer of butadiene-1,3 and a monovinylpyridine selected from the group consisting of unsubstituted monovinylpyridines and alkyl substituted monovinylpyridines, said resin and said rubbery copolymer being mutually compatible and being present in relative proportions of from 10 up to 30% of said resin and correspondingly from 90 down to 70% of said rubbery copolymer, said percentages being by weight based on the sum of said resin and said rubbery copolymer, and a formaldehyde-yielding hardening agent for said resin.

12. A heat-cured homogeneous mixture of a thermosetting, soluble, fusible phenol-aldehyde resin of the novolac type, a rubbery copolymer of butadiene-1,3 and a monovinylpyridine selected from the group consisting of unsubstituted monovinylpyridines and alkyl substituted monovinylpyridines, said resin and said rubbery copolymer being mutually compatible and being present in relative proportions of from 5 up to 10% of said resin and correspondingly from 95 down to 90% of said rubbery copolymer, said percentages being by weight based on the sum of said resin and said rubbery copolymer, and a formaldehyde-yielding hardening agent for said resin.

13. The process which comprises intimately and uniformly mixing a thermosetting, soluble, fusible phenol-aldehyde resin of the novolac type, and a rubbery copolymer of butadiene-1,3 and a monovinylpyridine selected from the group consisting of unsubstituted mono-vinylpyridines and alkyl substituted mono-vinylpyridines, said rubber copolymer being compatible with said resin, at a temperature below the softening point of said resin whereby mutual solution of said resin and said copolymer is prevented, masticating the resulting mixture at a temperature at least equal to the softening point of said resin and thereby effecting mutual solution of said resin and said rubbery copolymer, incorporating a formaldehyde-yielding hardening agent for the resin at some point in the process, and thereby obtaining an intimate homogeneous mixture of said resin, said rubbery copolymer, and said hardening agent which is adapted to be shaped and cured.

14. A process as set forth in claim 13 wherein said monovinylpyridine is 5-vinyl-2-methylpyridine.

15. A process as set forth in claim 13 wherein the relative proportions of said resin and said rubbery copolymer range from 5 to 70% of said resin and correspondingly from 95 to 30% of said rubbery copolymer, said percentages being by weight based on the sum of said resin and said rubbery copolymer.

16. A composition of matter comprising a mixture of a thermosetting, soluble, fusible, unmodified phenol-aldehyde resin of the novolac type, a rubbery copolymer of butadiene-1,3 and a mono-vinylpyridine selected from the group consisting of unsubstituted mono-vinylpyridines and alkyl substituted mono-vinylpyridines, said resin and said rubbery copolymer being mutually compatible and being present in the relative proportions of from 5 to 70% of said resin and correspondingly from 95 to 30% of said rubbery copolymer, said percentages being by weight based on the sum of said resin and said rubbery copolymer, and a formaldehyde-yielding hardening agent for said resin.

17. A heat-cured homogeneous mixture of a thermosetting, soluble, fusible, unmodified phenol-aldehyde resin of the novolac type, a rubbery copolymer of butadiene-1,3 and a mono-vinylpyridine selected from the group consisting of unsubstituted mono-vinylpyridines and alkyl substituted mono-vinylpyridines, said resin and said rubbery copolymer being mutually compatible and being present in the relative proportions of from 5 to 70% of said resin and correspondingly from 95 to 30% of said rubbery copolymer, said percentages being by weight based on the sum of said resin and said rubbery copolymer, and a formaldehyde-yielding hardening agent for said resin.

LEWIS Y. KILEY.

REFERENCES CITED

The following references are of record in the file of this patent:

UNITED STATES PATENTS

| Number | Name | Date |
| --- | --- | --- |
| 2,459,739 | Groten et al. | Jan. 19, 1949 |
| 2,532,374 | Shepard et al. | Dec. 5, 1950 |
| 2,561,215 | Mighton | July 17, 1951 |

FOREIGN PATENTS

| Number | Country | Date |
| --- | --- | --- |
| 595,290 | Great Britain | Dec. 1, 1947 |